United States Patent
Dykhoff

(10) Patent No.: US 6,536,169 B2
(45) Date of Patent: Mar. 25, 2003

(54) ADJUSTABLE RACK FOR SUPPORTING FIRESTOP MATERIAL IN A THROUGH-PENETRATION

(75) Inventor: Michael G. Dykhoff, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/871,750

(22) Filed: Jun. 1, 2001

(65) Prior Publication Data

US 2002/0178664 A1 Dec. 5, 2002

(51) Int. Cl.⁷ ................................................. E04C 2/52
(52) U.S. Cl. .................... 52/220.8; 52/220.1; 52/232; 52/745.16; 211/133.5; 211/175
(58) Field of Search ........................... 52/220.1, 220.5, 52/220.8, 232, 660, 742.1, 745.15, 745.16; 211/106, 175, 133.2, 133.5, 181.1; 248/49; 174/48

(56) References Cited

U.S. PATENT DOCUMENTS

| | | | | | |
|---|---|---|---|---|---|
| 790,112 A | * | 5/1905 | Cummings | ............... | 211/89.01 |
| 3,976,825 A | | 8/1976 | Anderberg | | |
| 4,093,818 A | | 6/1978 | Thwaites et al. | | |
| 4,249,353 A | * | 2/1981 | Berry | ........................ | 52/232 |
| 4,304,079 A | * | 12/1981 | Thorsten | ...................... | 174/48 |
| 4,419,535 A | * | 12/1983 | O'Hara | ......................... | 174/48 |
| 4,496,790 A | | 1/1985 | Spencer | | |
| 4,982,536 A | * | 1/1991 | Muhlethaler | ............... | 52/220.1 |
| 5,031,783 A | * | 7/1991 | Goudreau | ................ | 211/181.1 |
| 5,067,676 A | * | 11/1991 | Beele | ........................ | 52/232 X |
| 5,593,115 A | * | 1/1997 | Lewis | ........................ | 248/68.1 |
| 6,109,462 A | * | 8/2000 | Emalfarb et al. | ........... | 211/119 |
| 6,340,141 B1 | * | 1/2002 | Rinderer | ...................... | 248/49 |
| 6,341,704 B1 | * | 1/2002 | Michel, Jr. | ................ | 211/181.1 |
| 6,353,180 B1 | * | 3/2002 | DeBartolo, Jr. et al. | ...... | 174/48 |

FOREIGN PATENT DOCUMENTS

DE    3341-728 A    *  6/1985   ................ 52/220.8

OTHER PUBLICATIONS

U.S. patent application Ser. No. 09/702,414, Dykhoff, filed Oct. 31, 2000.

* cited by examiner

Primary Examiner—Carl D. Friedman
Assistant Examiner—Brian E. Glessner
(74) Attorney, Agent, or Firm—David B. Patchett

(57) ABSTRACT

An adjustable support rack for supporting firestop material in a through-penetration includes a frame sized to fit within the through-penetration, at least one adjustable support member movably connected with the frame for supporting the firestop material, and an adjustable mounting mechanism connected with the frame for securing the frame within the through-penetration. A method of fire stopping the through-penetration using the adjustable support rack is also described.

18 Claims, 5 Drawing Sheets

ADJUSTABLE RACK FOR SUPPORTING FIRESTOP MATERIAL IN A THROUGH-PENETRATION

FIELD OF THE INVENTION

The present invention relates generally to adjustable support racks and, more particularly, to an adjustable rack for supporting firestop material in openings in walls, floors, ceilings, or the like.

BACKGROUND OF THE INVENTION

One mechanism by which fire may spread from one compartment of a structure to another is through passages or openings, often referred to as through-penetrations, in floors, walls, ceilings, or the like. Such openings include, for example, cable access holes through which signal and power transmission cables pass.

Current methods used to prevent the spread fire and passage of smoke through such openings include cutting two intumescent sheets to follow the contour of the penetrating cables and providing a bead of moldable intumescent putty along the perimeter of each sheet. While this technique is generally satisfactory for resisting the spread of fire and preventing the passage of smoke from one compartment to another, installation is labor intensive and time consuming. Firetops fabricated in this manner also do not lend themselves to repeated re-entry for inspection, do not allow additional cables or wires to be run through the opening, and do not allow cables to be easily removed from the opening. To remove cables, for example, the intumescent material must be completely removed, discarded, and replaced with new intumescent material.

Techniques for fire stopping through-penetrations are also known in the prior art. The U.S. patent to Spencer U.S. Pat. No. 4,496,790 for example, discloses a self-anchoring poke-thru wiring device for the extension of communication and/or electrical wiring through a passage in a floor designed to prevent the spread of fire from one side of the floor to the other, and facilitate ready installation and removal of the device from above the floor opening. The device includes a pair of upper conduit portions aligned with a pair of lower conduit portions and a plurality of fire resistant expandable disks retained between an upper and lower plate intermediate the pairs of conduit portions, the disks and plates including aligned apertures with the conduit portions providing separate wireway channels.

These prior devices or techniques, however, suffer from certain drawbacks or shortcomings. Accordingly, there exists a need in the industry for a support rack for supporting intumescent material in through-penetrations which can be adjusted to fit in through-penetrations of various sizes, can be quickly and easily installed in the through-penetration, can be adjusted to provide maximum coverage of the open area around cable bundles of various sizes, is mechanically stable at temperatures typically encountered in a fire, and is inexpensive to produce.

SUMMARY OF THE INVENTION

The present invention provides an adjustable support rack for supporting firestop material in a through-penetration including a frame sized to fit within the through-penetration, at least one adjustable support member movably connected with the frame for supporting firestop material, and an adjustable mounting mechanism connected with the frame for securing the frame within the through-penetration. Firestop material refers to intumescent, endothermic, and ablative materials useful in resisting the spread of fire and smoke from one compartment of a structure to another.

In one embodiment, the support rack frame further includes a first side portion having a first end and a second end, a second side portion having a first end and a second end, and a generally rigid connecting portion extending between the first and the second side portion first ends, wherein the first and second side portions are arranged generally parallel and the connecting portion is arranged generally perpendicular to each of the first and second side portions, and further wherein the first side portion, the second side portion, and the connecting portion define an adjustably open support area, and each support member is movable within the open support area.

In one aspect of the invention, the support member comprises a plurality of support rods extending between and movably connected with the first and the second side portions. In another aspect of the invention, each of the first and second side portions includes a guide rail containing a plurality of aligned notches which receive ends of the rods and thereby serve to retain the rods at specific locations along the guide rails.

The adjustable mounting mechanism preferably includes a first fixed extension extending outwardly from the first side portion, a first latch slidably retained within the first side portion operatively associated with the first extension, a second fixed extension extending outwardly from the second side portion, a second latch slidably retained within the second side portion operatively associated with the second extension, each latch having a retracted position wherein the latch is arranged in close relation to its associated extension, and an actuated position wherein the latch is arranged away from its associated extension for engagement with the through-penetration, thereby to securely mount the support rack in the through-penetration. The adjustable mounting mechanism may also include a locking mechanism to prevent the device from accidentally releasing.

In another embodiment, the adjustable mounting mechanism includes a manually operable threaded device, such as a thumb screw or turnbuckle, capable of engaging the through-penetration with sufficient force to securely hold the support rack in place.

In another aspect of the invention, the support rack includes at least one extension attached to each of the front, back, and/or sides of the support rack to allow through-penetrations having cross-sectional shapes and sizes different from the support rack to be covered more completely. The extensions are removably connected with and extend outwardly from the front, back, or sides of the frame to allow the support rack to be sized for different sized through-penetrations.

The support rack is formed of a material that is mechanically heat stable at temperatures typically encountered in a fire and preferably to at least about 1500° F., more preferably to at least about 1700° F., and most preferably to 2000° F. One suitable material is 0.150 inch cold rule steel rod. In one embodiment, the material is electrically nonconductive. In another embodiment, the support rack is provided with a non electrically conductive coating such as a paint, powder, and insulating resin.

In another aspect of the invention, the support rack includes an enclosure arranged over the upper surface of the support rack which encloses and protects the firestop material arranged on the support rack, thereby ensuring the system will withstand the water pressure exerted by a hose stream and meet the criteria set forth in ASTM E814.

The present invention also provides a method of fire stopping a through-penetration in a wall, floor, ceiling, or the like comprising the steps of providing an adjustable support rack including support members movable within an open area of the support rack for supporting firestop material in the through-penetration, mounting the support rack in the through-penetration, arranging the support members to maximize coverage of the open area, and arranging firestop material on the support rack. The method may further include providing an enclosure over the firestop material.

BRIEF DESCRIPTION OF THE DRAWING

The present invention will be further described with reference to the accompanying drawings, in which.

DETAILED DESCRIPTION

Figure 1:
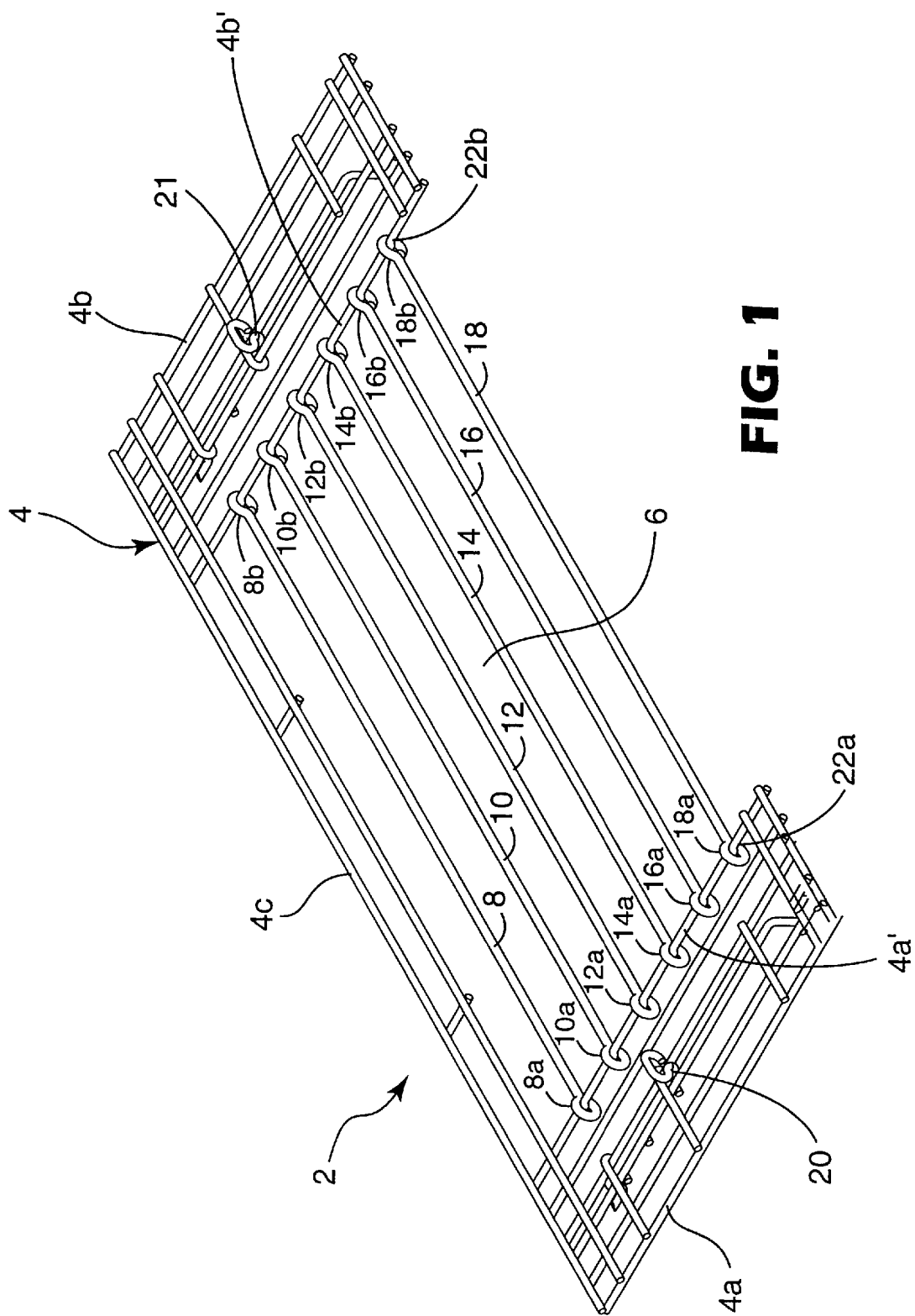
FIG. 1 is a perspective view of an adjustable support rack in accordance with the invention.
Figure 2:
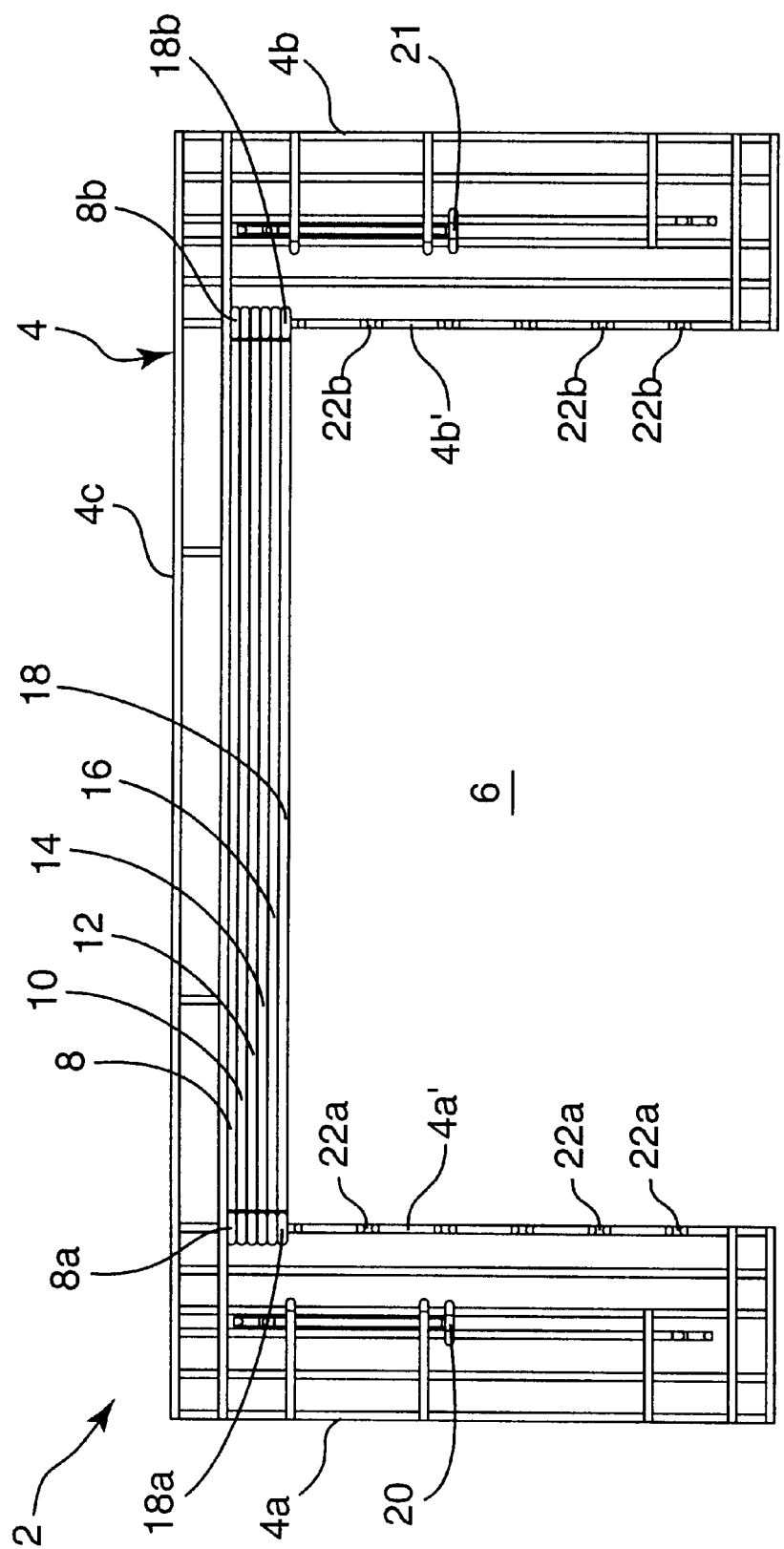
FIG. 2 is a top view of the support rack showing the adjustable support members arranged together.

Referring now to the drawings, wherein like reference numerals refer to like or corresponding parts throughout the several views, FIGS. 1 and 2 show an adjustable support rack 2 for supporting firestop material in a through-penetration. The term through-penetration generally refers to an opening in a floor, wall, ceiling, or the like, which allows cables, wires, pipes, or other items to pass from one compartment of a structure to another.

The support rack includes a generally U-shaped frame 4 defining an open area 6, adjustable support members 8, 10, 12, 14, 16, 18 movably connected with the frame 4, and adjustable mounting mechanisms 20, 21 connected with the frame 4 for securing the frame within a through-penetration.

The frame 4 includes first 4a and second 4b side portions, and a rigid connecting portion 4c which extends between and connects an end of the first side portion 4a with a corresponding end of the second side portion 4b. The side portions 4a, 4b are generally parallel and the connecting portion 4c is perpendicular to the side portions 4a, 4b. Each first 4a and second 4b side portion includes guide rails 4a', 4b', respectively, which slidably receive opposite ends of each support rod 8, 10, 12, 14, 16, 18. Each guide rail 4a', 4b' is provided with pairs of aligned notches 22a, 22b, for loosely retaining the support rods 8, 10, 12, 14, 16, 18 at evenly spaced locations along the guide rails 4a', 4b'.

The adjustable support members 8, 10, 12, 14, 16, 18 are formed of longitudinally extending support rods provided with looped end portions 8a,b, 10a,b, 12a,b, 14a,b, 16a,b, 18a,b, which encircle the guide rails 4a', 4b' and allow the support rods 8, 10, 12, 14, 16, 18 to be slid along the guide rails 4a', 4b'. FIG. 1 shows the six support rods 8, 10, 12, 14, 16, 18 arranged in an evenly spaced fashion within the open area 6 with the looped end portions 8a,b, 10a,b, 12a,b, 14a,b, 16a,b, 18a,b, of each support rod disposed in aligned notches 22a, 22b, whereby the support rods 8, 10, 12, 14, 16, 18 transect the open area 6 defined by the frame 4. FIG. 2 shows the support members 8, 10, 12, 14, 16, 18 arranged in close relation adjacent the rigid connecting portion 4c, whereby the open area 6 is free of support members. It will be recognized that the number of support members 8, 10, 12, 14, 16, 18 may be varied depending on the size of the through-penetration to be fire stopped.

Figure 3:
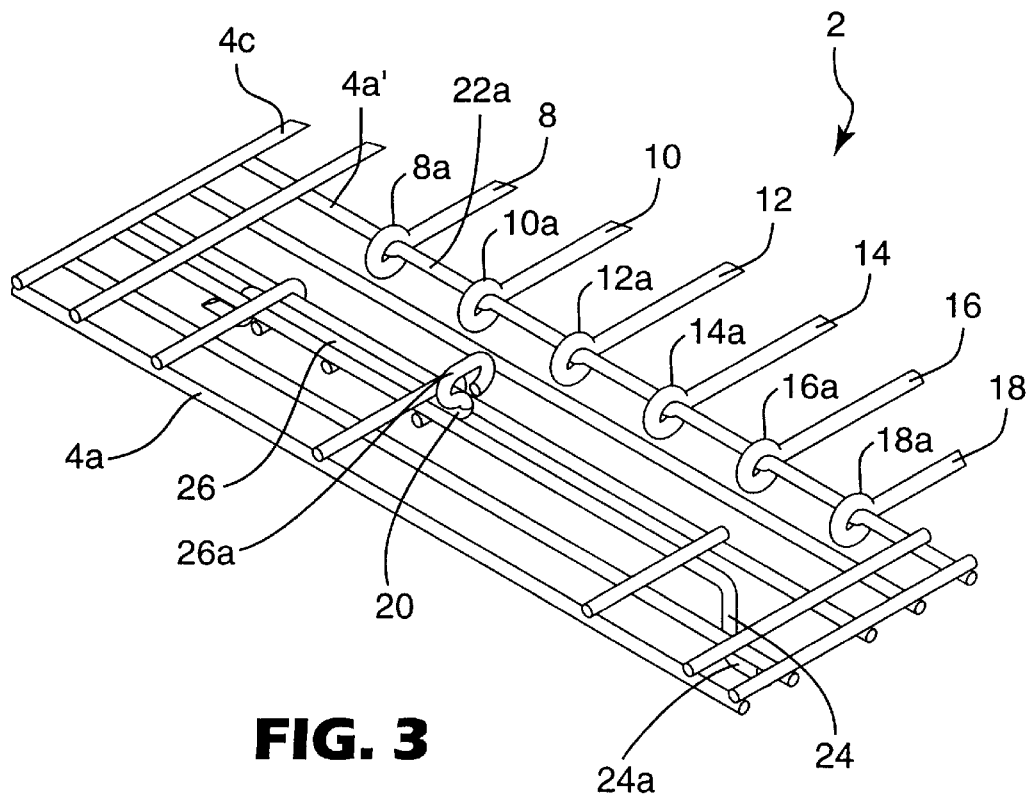
FIG. 3 is a detailed perspective view showing an end portion of the support rack.

FIG. 3 shows the adjustable mounting mechanism 20 in greater detail. The mounting mechanism 20 includes a fixed extension 24 extending outwardly beneath the first side portion 4a. The fixed extension 24 is formed integrally with the side portion and includes an end portion 24a adapted to engage the through-penetration. The mounting mechanism 20 further includes a latch 26 slidably retained within the first side portion 4a which is operatively associated with the fixed extension 24.

The latch 26 includes a handle portion 26a which allows the latch to be moved between a retracted position wherein the latch is arranged in close relation with the fixed extension so that the support rack 2 can be positioned within a through-penetration, and an actuated position wherein after the support rack 2 is positioned in the through-penetration, the latch may be slid away from the fixed extension 24 for engagement with the though-penetration, thereby securely holding the support rack in a place within the through-penetration. It will be recognized that other mounting devices including manually operable threaded devices such as a thumb screw, turnbuckle, spring loaded device, or other mechanical device capable expanding to securely hold the support rack in place within the through-penetration may also be used. Such devices may also include locks to prevent accidental release of the device. In addition, conventional fasteners such as nails, screws, and the like may also be used to secure the support rack in a through-penetration.

The support rack 2 is preferably constructed to be non electrically conductive. This can be accomplished by constructing the support rack 2 from an electrically insulating material, such as a ceramic material, or constructing the support rack 2 from an electrically conducting material, such as steel, and then coating the electrically conducting material with an electrically insulating material. Suitable electrically insulating coating materials include synthetic polymers and paints having high dielectric strength values. Specific insulating coating materials include synthetic rubber coatings available from Plasti Dip International, Circle Pines, Minn., which have a dielectric strength value of 683 volt/mil, and aluminum oxide coatings available from White Engineering Corporation, Newton, Pa., which have dielectric strength values up to 1200 volt/mil. The insulating coatings generally are applied to a thickness of less than 10 mil, and preferably from 4–8 mil.

The support rack is also formed of a material capable of withstanding temperatures typically encounter in a fire, preferably at least about 1500° F. Capable of withstanding such temperatures refers to the ability of the material to remain structurally stable and support its own weight and the weight of the firestop material at such temperatures. A suitable material is 0.150 inch cold rule steel rod. The particular material selected is not significant to the invention hereof, so long as it provides the described function.

Figure 4:
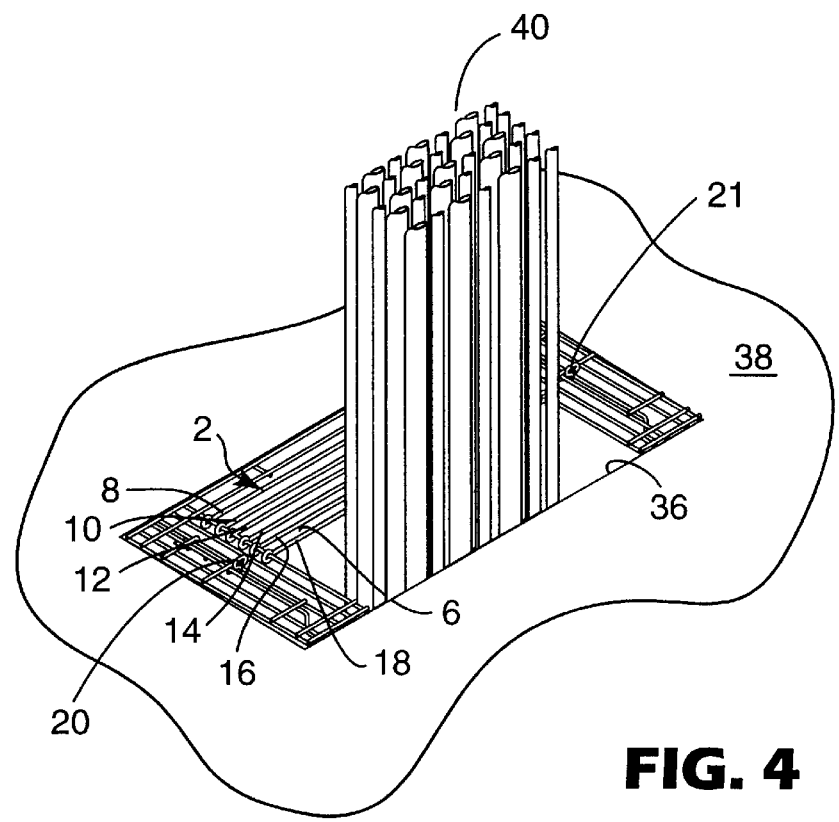
FIG. 4 is a perspective view of the support rack installed in a through-penetration.
Figure 5:
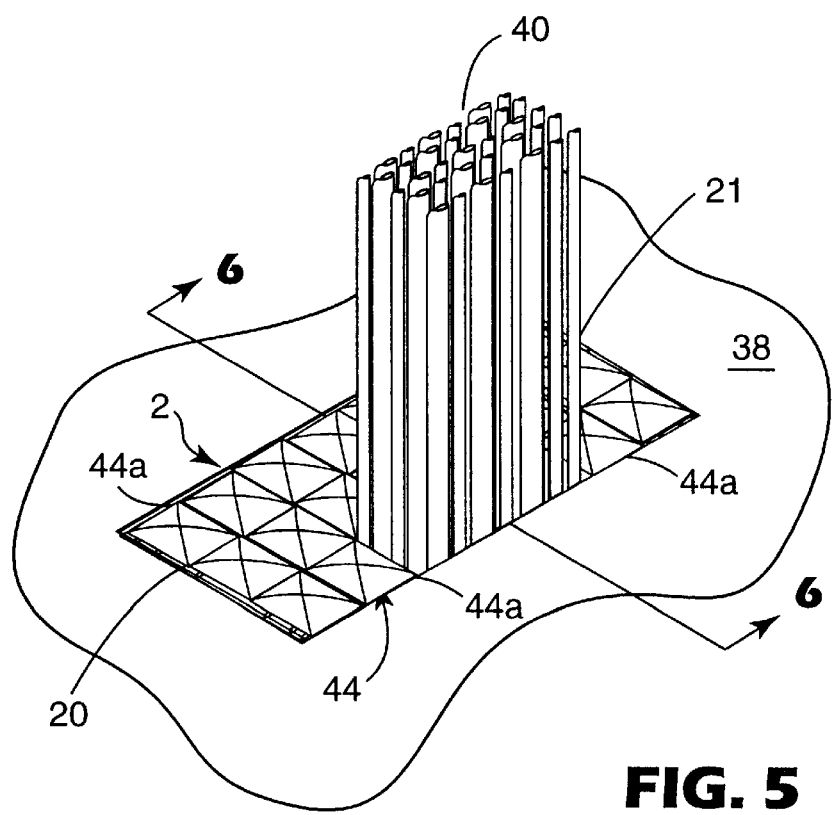
FIG. 5 is a perspective view of the support rack installed in a through-penetration with pouches of firestop material arranged on the support rack.
Figure 6:
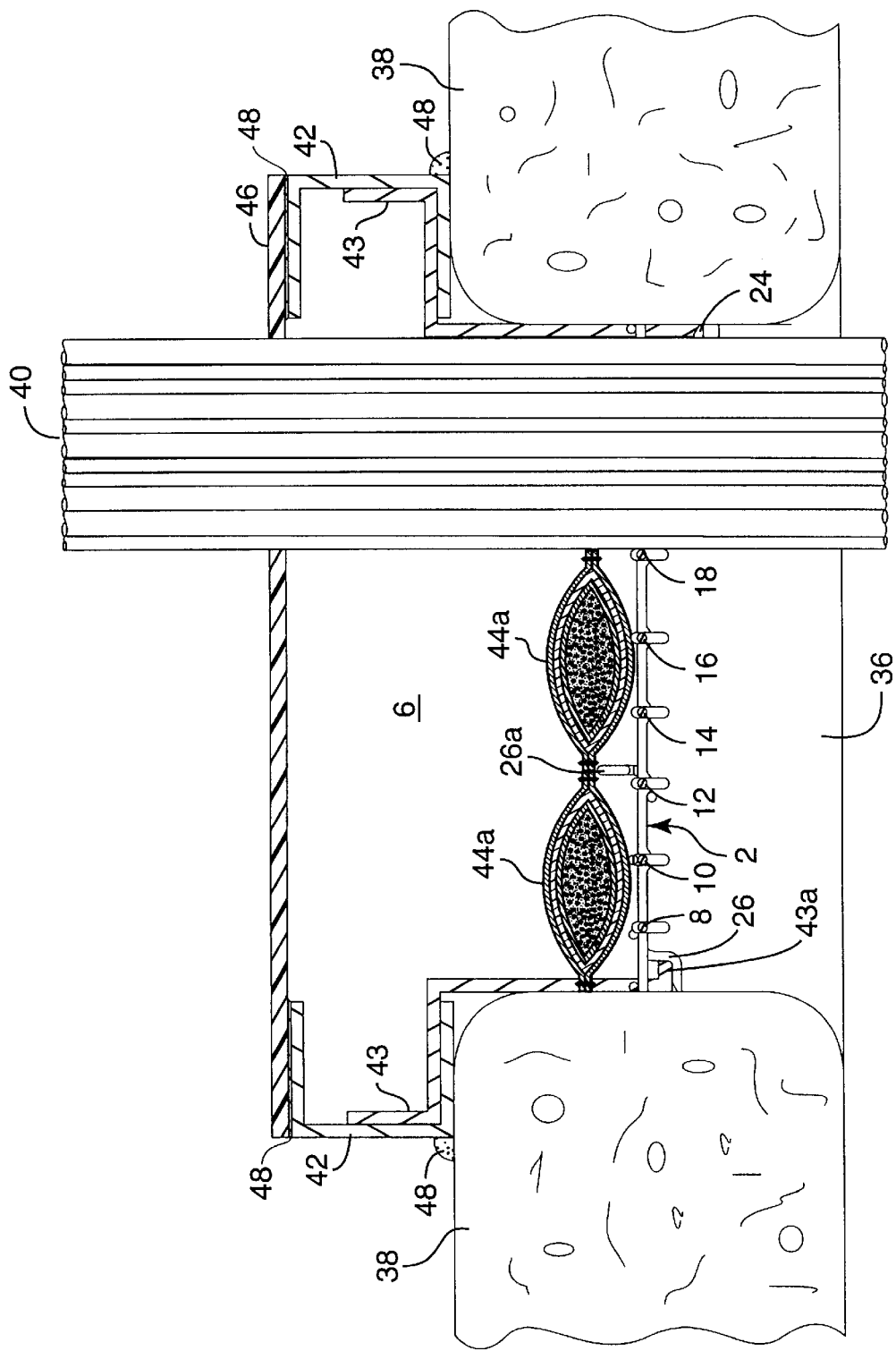
FIG. 6 is a cross-sectional view taken along line 6—6 of FIG. 5.

FIGS. 4–6 show the support rack 2 installed in a typical through-penetration 36 in a concrete floor 38 with a cable bundle 40 passing through the support rack 2 and through-penetration 36. As shown in FIG. 6, the installation includes a riser 42 which extends around the perimeter of the through-penetration 36 on the concrete floor 38. Such a riser is often provided with through-penetrations but are not necessary for the present invention to be successfully employed. Stirrups 43 extend downwardly from the riser 42 into the through-penetration opening 36 and include a terminal portion 43a which extends laterally inwardly into the through-penetration and serves to support the support rack 2 in the through-penetration.

To install the support rack 2 in the through-penetration 36, the adjustable support members 8, 10, 12, 14, 16, 18 are first moved to allow the cable 40 to pass through the support rack. The support rack 2 is then positioned in the through-penetration opening 36 with the cable bundle 40 passing through the support rack 2. The mounting mechanisms 20, 21 are then expanded to engage the terminal portions 43a of the stirrups 43 to securely fix the support rack 2 in place.

The adjustable support members 8, 10, 12, 14, 16, 18 were arranged in and evenly spaced fashion to maximize coverage of the open area 6 adjacent the cable bundle 40. Firestop material 44 in the form of individual pouches 44a was then arranged on the support rack 2. While firestop material in the form of individual pouches is shown, it will be recognized that any form of firestop material capable of being supported on the support rack may be used. A preferred form of firestop material is described in U.S. patent application Ser. No. 09/702,414, which is assigned to the same assignee as the present invention.

The installation was completed by providing an enclosure 46 (FIG. 6) over the top of the support rack 2 and firestop material 44. A similar enclosure (not shown) may also be provided beneath the support rack 2 and firestop material 44. The enclosure 46 is provided in part to ensure that the system will pass the hose stream test defined in ASTM E814. To completely seal the installation, beads of intumescent putty 48 were provided between the interface of the enclosure 46 and riser 42, and at the interface of the riser 42 with the concrete 38.

Figure 7:
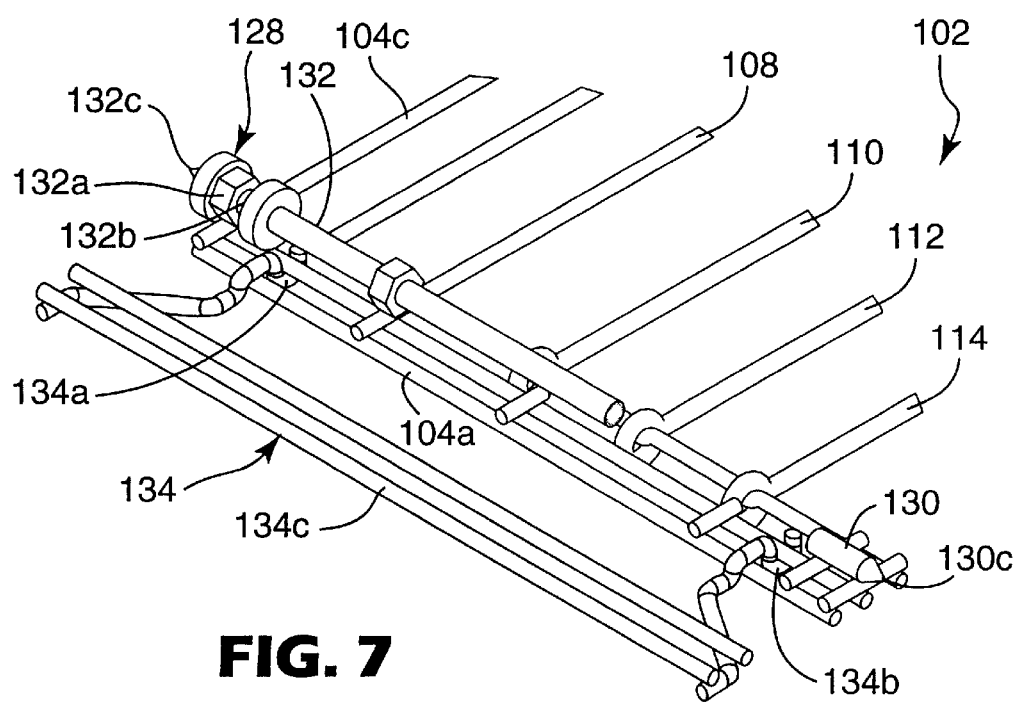
FIG. 7 is a detailed perspective view of the end of an alternate embodiment of the invention showing a side extension connected with the support rack.

FIG. 7 shows an alternate embodiment of the invention including a manually expandable threaded device 128 for mounting the support rack 102 in a through-penetration. Features in FIG. 7 functionally similar to those in FIGS. 1–3 are shown with reference numerals incremented by 100. The device 128 includes a stationary member 130 rigidly connected with the support rack which extends beyond the end of the side portion 104a of the support rack 102 for engagement with the through-penetration, and a threaded member 132 aligned with the stationary member 130 which includes an internally threaded female portion 132a rigidly connected with the support rack and a threaded shaft portion 132b rotatably arranged within the female portion 132a. The threaded member 132 can be moved relative to the stationary member 130 beyond the end of the side portion 104a of the support rack for engagement with the through-penetration by rotating the shaft portion 132b. Both the stationary member 130 and the threaded member 132 are provided with pointed ends 130c, 132c, respectively, capable of penetrating the through-penetration to mount the support rack directly to the through-penetration if no mounting brackets or recesses are provided in the through-penetration.

FIG. 7 also shows a side extension 134 attached to either side portion 104a extending laterally outwardly from the side portion 104a to increase the overall width of the support rack 102. It will be recognized that similar extensions may also be attached to the other side, the front, or the back of the frame 104, and extensions may be connected to each other to further increase the overall size of the support rack. The side extension 134 includes connecting portions 134a, 134b which interlock with the side portion 104a, and an extension grate portion 134c connected with each connecting portion 134a, 134b for supporting firestop material thereon.

EXAMPLE

In order that the invention described herein can be more fully understood, the following example is set forth. It should be understood that the example is for illustrative purposes only, and is not to be construed as limiting this invention in any manner.

An adjustable support rack having the design shown in FIGS. 1–6 was installed in a through-penetration similar to the one shown in FIG. 6, which included a riser and stirrups for supporting the rack in the through-penetration. The support rack was constructed of 0.150 inch cold rule steel rod. The through-penetration opening was formed in a concrete floor eight inches thick. Intumescent putty was provided between the cables comprising the cable bundle, between the riser and the concrete, and between the riser and the enclosure.

The firestop material was provided in the form of six pouches which were arranged on the support rack to completely fill the open area of the support rack. Each pouch had the following general construction: first and second composite outer layers attached along their outer peripheral edges, thereby forming a cavity which was filled with intumescent material.

The first outer composite layer, which was arranged adjacent the support rack and was exposed to the heat source, had the following laminate structure: (1) a first outer layer of Johns Manville style 068/50 cover web available from Performance Fabrics Group, Greensboro, N.C.; (2) an internal layer of ¼ inch thick INTERAM ULTRA GS 0.045–0.055 inch intumescent mat available from 3M Company, St. Paul, Minn. arranged adjacent the first outer layer; (3) a second inner layer of Johns Manville style 068/50 cover web arranged adjacent the intumescent layer; and (4) an infrared radiation blocking layer of NEXTEL FLAME STOPPING DOT PAPER available from 3M Company, St. Paul, Minn. arranged adjacent the inner layer of cover web. The first outer layer of cover web, the internal intumescent mat, and second inner layer of cover web were stitch bonded together, thereby forming a laminate layer having a cover web-intumescent mat-cover web construction.

The second outer composite layer had the same construction as the first outer composite layer except the layer of infrared radiation blocking NEXTEL FLAME STOPPING DOT PAPER was omitted. The first and second composite outer layers were sewn together using Cotton Core Spun 60/36 polyester thread available from Eastern Woolen Company, St. Paul, Minn., thereby forming the pouch.

When the firestop was tested in accordance with ASTM E814, the temperature and flame criteria of ASTM E814 were met with cable fills of 0% and 35% for a one hour rating.

In addition, the same firestop was tested in accordance with UL 1479, Fire Tests of Through-Penetration Firestops, with a cable fill of 15% at ambient temperature and at 400° F. The firestop obtained L-ratings of 0.51 and 2.49 cubic feet per minute per square foot at ambient temperature and 400° F., respectively.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An adjustable support rack for supporting firestop material in a through-penetration, comprising:
    (a) a frame sized to fit within the through-penetration;
    (b) at least one adjustable support member movably connected with said frame defining a generally planar support surface for supporting the firestop material; and
    (c) an adjustable mounting mechanism connected with said frame for securing said frame within the through-penetration, said adjustable mounting mechanism extending in a direction parallel to said planar support surface and being movable beyond the periphery of said frame to engage the through-penetration.

2. An adjustable support rack as defined in claim 1 wherein each of said first and second side portions includes a guide rail containing a plurality of aligned notches for receiving ends of said support rods.

3. An adjustable support rack as defined in claim 1, wherein said support rack further comprises side extensions removably connected with each of said side portions, said side extensions extending outwardly in opposite directions from each of said side portions.

4. An adjustable support rack as defined in claim 1 wherein said support rack is formed of a material mechanically heat stable to a temperature of at least 1500° F.

5. An adjustable support rack as defined in claim 4 wherein said heat stable material is 0.150 inch cold rule steel rod.

6. An adjustable support rack as defined in claim 1, wherein said support rack is formed of an electrically nonconductive material.

7. An adjustable support rack as defined in claim 6, wherein said electrically nonconductive material is a ceramic material.

8. An adjustable support rack as defined in claim 1, wherein said frame further comprises an electrically nonconductive coating.

9. An adjustable support rack as defined in claim 8, wherein said coating has a dielectric strength value of at least 600 volts/meter and a thickness of about 4 mil to about 8 mil.

10. An adjustable support rack for supporting firestop material in a through-penetration, comprising:
    (a) a frame sized to fit within the through-penetration;
    (b) at least one adjustable support member movably connected with said frame for supporting the firestop material; and
    (c) an adjustable mounting mechanism connected with said frame for securing said frame within the through-penetration, wherein said adjustable mounting mechanism comprises a first fixed extension extending from said first side portion, a first latch slidably retained within said first side portion operatively associated with said first extension, a second fixed extension extending from said second side portion, a second latch slidably retained within said second side portion operatively associated with said second extension, each said latch having a retracted position wherein said latch is arranged in close relation to its associated extension, and an actuated position wherein said latch is arranged away from its associated extension for engagement with the through-penetration, thereby to secure the support rack in the through-penetration.

11. An adjustable support rack for supporting firestop material in a through-penetration, comprising:
    (a) a frame sized to fit within the through-penetration;
    (b) at least one adjustable support member movably connected with said frame for supporting the firestop material; and
    (c) an adjustable mounting mechanism connected with said frame for securing said frame within the through-penetration, wherein said adjustable mounting mechanism comprises a manually operable threaded device capable of engaging the through-penetration with sufficient force to securely hold said support rack in place.

12. An adjustable support rack for supporting firestop material in a through-penetration, comprising:
    (a) a frame sized to fit within the through-penetration;
    (b) at least one adjustable support member movably connected with said frame for supporting the firestop material;
    (c) an adjustable mounting mechanism connected with said frame for securing said frame within the through-penetration; and
    (d) an enclosure arranged to cover the firestop material.

13. An adjustable support rack for supporting firestop material in a through-penetration, comprising:
    (a) a frame sized to fit within the through-penetration;
    (b) support means movably connected with said frame defining a generally planar support surface for supporting the firestop material; and
    (c) mounting means connected with said frame for securing said frame within the through-penetration, said mounting means extending in a direction parallel to said planar support surface and being movable beyond the periphery of said frame to engage the through-penetration.

14. A firestop for preventing the spread of fire from one compartment of a structure to another, comprising:

(a) a frame sized to fit within the through-penetration;

(b) at least one adjustable support member movably connected with said frame for supporting firestop material;

(c) an adjustable mounting mechanism connected with said frame for securing said frame within the through-penetration; and (d) firestop material arranged on said support member.

15. A firestop as defined in claim 14, wherein said firestop exhibits fire stopping properties sufficient to meet the temperature and flame criteria set forth in ASTM E814 for cable fills up to 35% for a one hour rating.

16. A firestop as defined in claim 15, wherein said firestop has fire stopping properties sufficient to achieve an L rating as set forth in UL 1479 of 2.49 cubic feet per minute per square foot for a cable fill of 15% at 400° F.

17. A method of fire stopping a through-penetration in a wall, floor, ceiling, or the like, comprising the steps of:

(a) providing an adjustable support rack including support members movable within an open area of the support rack for supporting firestop material in the through-penetration;

(b) mounting the support rack in the through-penetration;

(c) arranging the support members to maximize coverage of the open area; and (d) arranging firestop material on the support rack.

18. A method of fire stopping a through-penetration as defined in claim 17 further comprising the step of providing an enclosure covering the firestop material.

* * * * *